US011014605B2

(12) United States Patent
Bergmann et al.

(10) Patent No.: US 11,014,605 B2
(45) Date of Patent: May 25, 2021

(54) HYDRAULIC STEERING DEVICE

(71) Applicant: HYDRAULIK NORD FLUIDTECHNIK GMBH & CO. KG, Parchim (DE)

(72) Inventors: Erhard Bergmann, Banzkow/OT Mirow (DE); Toralf Käckenmeister, Raduhn (DE); Markus De La Motte, Muchow (DE); Steffen Janetzki, Brüel (DE)

(73) Assignee: DANFOSS POWER SOLUTIONS PARCHIM GMBH, Parchim (DE)

( * ) Notice: Subject to any disclaimer, the term of this patent is extended or adjusted under 35 U.S.C. 154(b) by 306 days.

(21) Appl. No.: 15/781,319

(22) PCT Filed: Nov. 25, 2016

(86) PCT No.: PCT/EP2016/078843
§ 371 (c)(1),
(2) Date: Jun. 4, 2018

(87) PCT Pub. No.: WO2017/097610
PCT Pub. Date: Jun. 15, 2017

(65) Prior Publication Data
US 2018/0362072 A1 Dec. 20, 2018

(30) Foreign Application Priority Data

Dec. 8, 2015 (DE) ..................... 10 2015 121 328.1

(51) Int. Cl.
*B62D 5/30* (2006.01)
*B62D 5/09* (2006.01)
(Continued)

(52) U.S. Cl.
CPC ............... *B62D 5/30* (2013.01); *B62D 5/091* (2013.01); *B62D 5/093* (2013.01); *B62D 5/32* (2013.01);
(Continued)

(58) Field of Classification Search
CPC . B62D 5/30; B62D 5/32; B62D 5/091; B62D 5/093; B62D 5/065; B62D 5/09
(Continued)

(56) References Cited

U.S. PATENT DOCUMENTS

2001/0036397 A1 * 11/2001 Pierrou ................. F15B 11/028
414/540
2008/0087014 A1 * 4/2008 Schick ................... B62D 5/091
60/403
(Continued)

FOREIGN PATENT DOCUMENTS

| DE | 10 2011 112625 A1 | 3/2013 | |
| DE | 102011112625 A1 * | 3/2013 | ............. B62D 5/091 |
| WO | WO-2008017290 A1 * | 2/2008 | ............... B62D 5/09 |

OTHER PUBLICATIONS

International Search Report dated Mar. 9, 2017, dated Mar. 17, 2017.
(Continued)

*Primary Examiner* — Anne Marie M Boehler
(74) *Attorney, Agent, or Firm* — Norris McLaughlin, P.A.

(57) ABSTRACT

A hydraulic steering device hydraulically connects a steering cylinder to a supply system, wherein the supply system can be operatively connected hydraulically to the steering cylinder via a steering valve in order to configure a main flow connection, and the supply system can be operatively connected hydraulically to the steering cylinder via a flow control valve arrangement in order to configure an auxiliary flow connection which bypasses the main flow direction.

9 Claims, 2 Drawing Sheets

Figure 1:
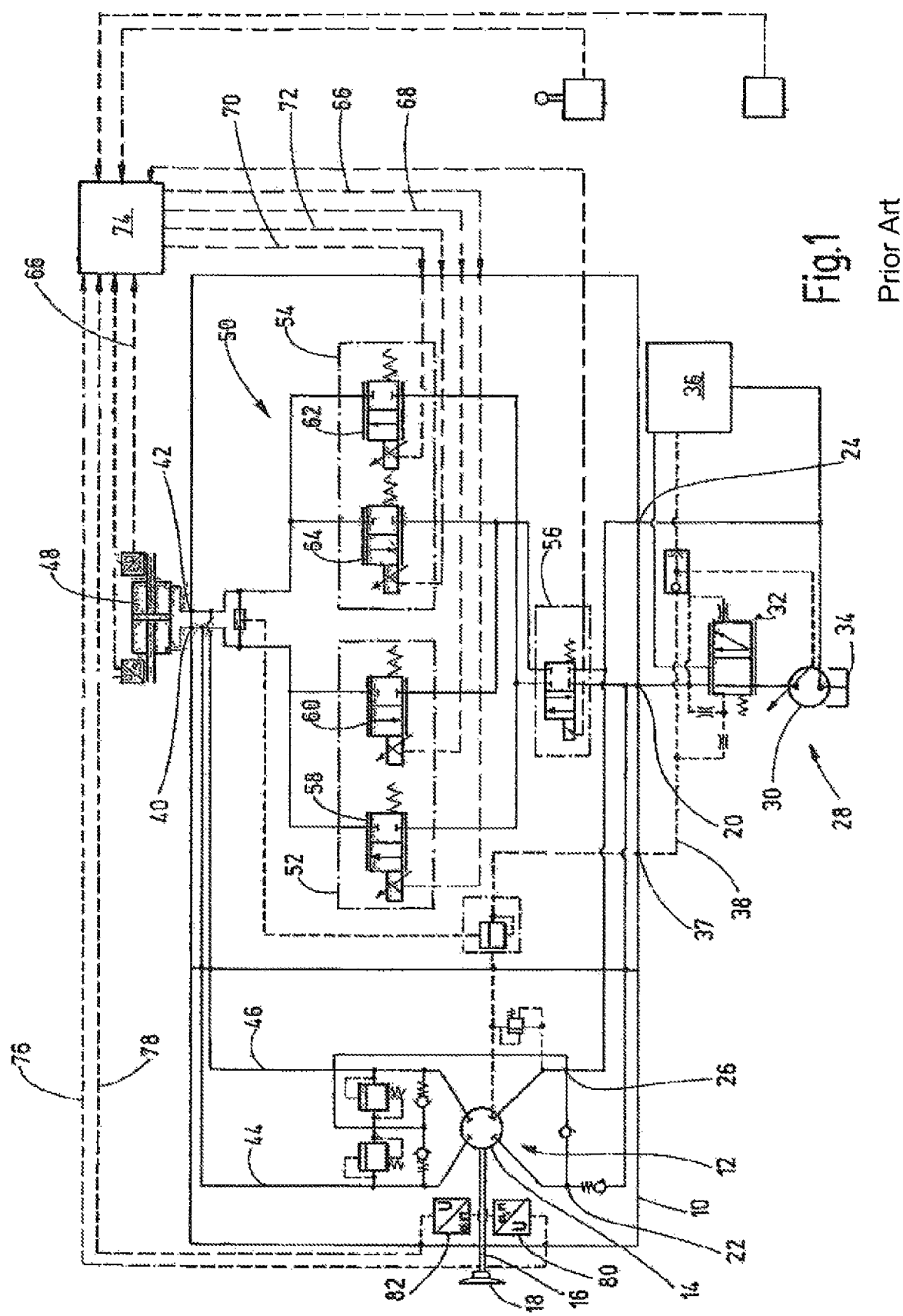

(51) Int. Cl.
*F15B 11/10* (2006.01)
*F15B 20/00* (2006.01)
*B62D 5/093* (2006.01)
*B62D 5/32* (2006.01)

(52) U.S. Cl.
CPC ............ *F15B 11/10* (2013.01); *F15B 20/008* (2013.01); *F15B 2211/45* (2013.01); *F15B 2211/7053* (2013.01)

(58) Field of Classification Search
USPC .......................................... 180/434, 441, 442
See application file for complete search history.

(56) References Cited

U.S. PATENT DOCUMENTS

| | | | | |
|---|---|---|---|---|
| 2008/0091319 A1* | 4/2008 | Schick | ................... | B62D 5/003 701/41 |
| 2011/0277460 A1* | 11/2011 | Brummund | ............ | B62D 5/003 60/484 |
| 2019/0111967 A1* | 4/2019 | Bergmann | ............. | B62D 5/093 |

OTHER PUBLICATIONS

English Translation of International Search Report dated Mar. 9, 2017, dated Mar. 17, 2017.

* cited by examiner

HYDRAULIC STEERING DEVICE

This application is the U.S. National Stage of International Application No. PCT/EP2016/078843, filed Nov. 25, 2016, which claims foreign priority benefit under 35 U.S.C. § 119 of German Application No. 10 2015 121 328.1 filed Dec. 8, 2015.

The invention relates to a hydraulic steering device.

Hydraulic steering devices, for example in the vehicle sector, are fundamentally known to the person skilled in the art. Such a hydraulic steering device is described, for example, in DE 10 2011 112 625 A1. This is generic for the subject matter of the present invention.

It is the object of the present invention to indicate a generic hydraulic steering device which can be realized with little outlay and which guarantees a high degree of functional safety.

The object is achieved by the subject matter set forth herein.

The subject matter of the present invention is a hydraulic steering device which hydraulically connects a steering cylinder to a supply system, wherein the supply system can be operatively connected hydraulically to the steering cylinder via a steering valve in order to configure a main flow connection, and the supply system can be operatively connected hydraulically to the steering cylinder via a flow control valve arrangement in order to configure an auxiliary flow connection which bypasses the main flow connection, wherein the flow control valve arrangement can be actuated by way of an electrical control unit, and the flow control valve arrangement comprises individually actuable valve groups which are connected in each case into the feed line and return line of the auxiliary flow connection. According to the invention, it is provided that the flow control valve arrangement comprises at least one valve which is configured to produce a defined or definable volumetric flow independently of a pressure difference which prevails at the valve.

The advantage of this is that the functional quality of the steering device is increased. Thus, for example in the event of failures, in which individual valves do not function or are not actuated properly, the repercussions can be advantageously compensated for by means of the pressure-independent constant definable volumetric flow. The present invention therefore functions in accordance with the fail-safe-principle which is well known to the person skilled in the art. Another advantage is that the operability of the steering device is improved. A uniform steering behaviour can thus be advantageously guaranteed independently of steering forces occurring at the wheels of a vehicle and in the region of a steering cylinder which are caused, purely by way of example, by unevenness of the ground or objects lying on the ground. As a consequence of the automatic control of the predefined volumetric flow by way of the valves, a movement speed is impressed on the steering cylinder, independently of the steering forces occurring or respectively independently of a pressure difference which prevails at the valves.

In a preferred configuration of the present invention, it is provided that the at least one valve is furthermore configured to produce a defined or definable volumetric flow independently of a temperature of the valve and/or a temperature of a fluid flowing through the valve.

The advantage of this is that the functional quality and the operability of the steering device are increased. For example, unwanted modifications in the volumetric flow as a consequence of heating by operating heat or other sources of heat can be advantageously compensated for.

In another preferred configuration of the present invention, it is provided that the at least one valve is a two-way flow control valve.

The advantage of this is that a design of valves is provided, which is well known to the person skilled in the art and which has the required properties, and which can be used safely and with little outlay.

In another preferred configuration of the present invention, it is provided that the flow control valve arrangement comprises four valves, one valve of which is connected into a feed line of right-hand steering, one valve is connected into a return line of left-hand steering, one valve is connected into a feed line of left-hand steering and one valve is connected into a return line of right-hand steering.

The advantage of this is that each of the valves can be actuated individually. While performing an alignment with the movement of the steering cylinder, it is possible, if necessary, to act in a controlling manner on each valve separately.

In another preferred configuration of the present invention, it is provided that a common release shut-off valve is arranged upstream of the valves.

The advantage of this is that the auxiliary flow connection can be actively or passively connected by actuating the common release shut-off valve.

In another preferred configuration of the present invention, it is provided that the flow control valve arrangement can also be operated as a solo device, as a pure "steer-by-wire" system.

The advantage of this is that the operation of the steering device is more comfortable and can also be automated and controlled remotely. In conjunction with the valves, which can realise a defined volumetric flow independently of a prevailing pressure difference, a steering function can be achieved with a high degree of precision and uniformity.

In another preferred configuration of the present invention, it is provided that the release shut-off valve is configured to shut the flow control valve arrangement off in the event of failure.

As a result, the safety of the steering device is advantageously increased.

In another preferred configuration of the present invention, it is provided that, in order to check the plausibility of the actuation signals for the valves, the control unit is connected to transducers which are configured to detect an actual position of the steering cylinder.

Consequently, a correction signal can advantageously be produced in the event of a faulty movement of the steering cylinder.

Further preferred configurations of the invention result from the remaining features which are indicated in the subordinate claims.

Figure 2:
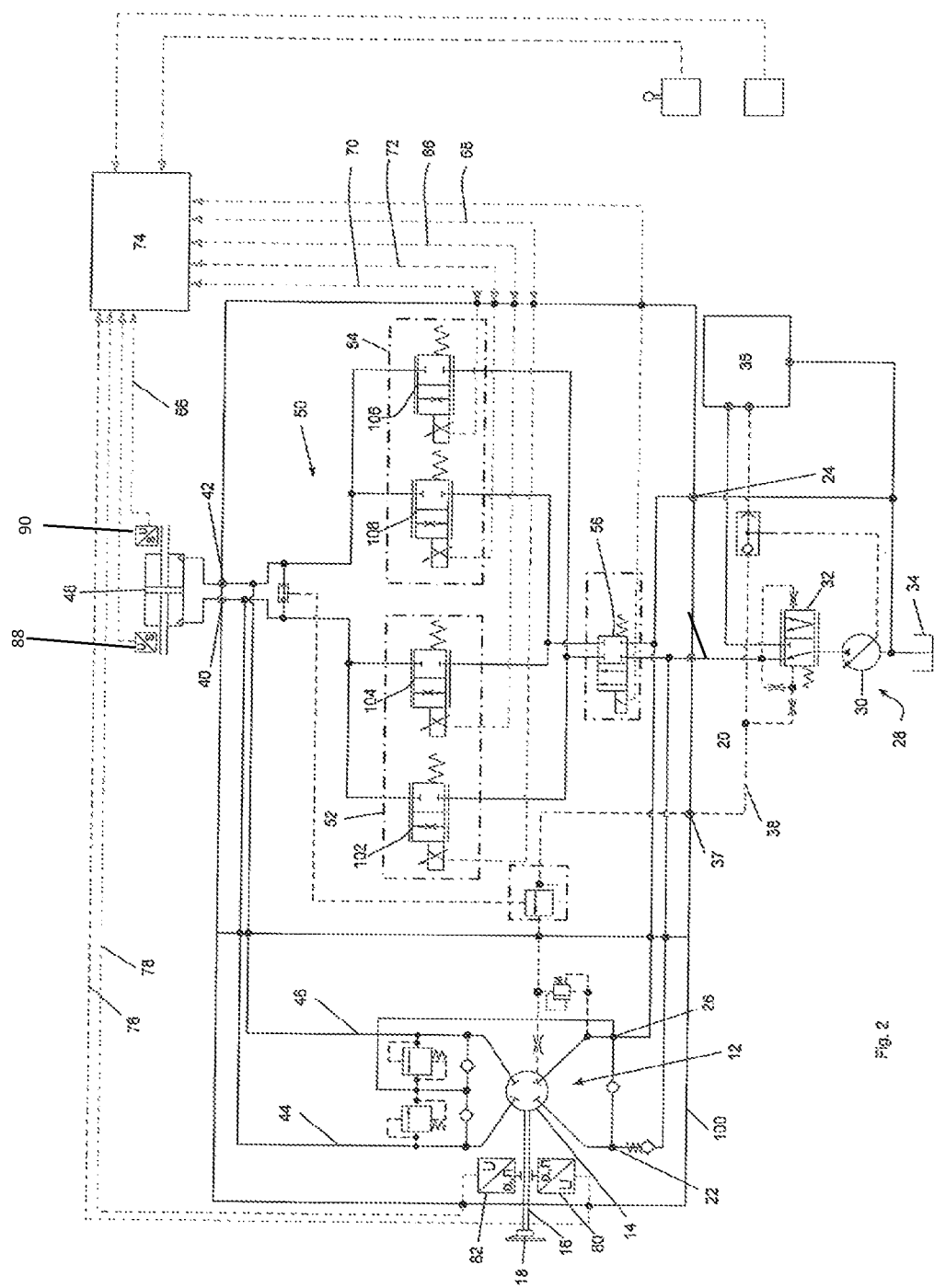

The invention is explained in greater detail below with reference to an embodiment example and accompanying drawings, wherein:

FIG. 1 shows a representation in principle of a hydraulic steering device according to the prior art, and FIG. 2 shows a representation in principle of a hydraulic steering device according to the invention in a preferred embodiment.

FIG. 1 shows a representation in principle of a hydraulic steering device according to the prior art from DE 10 2011 112 625 A1, so that no conclusive description is provided at this point. The hydraulic steering device 10 comprises a steering valve 12 having a rotary slide-controlled metering pump 14 which is connected via a steering linkage 16 to a manual steering wheel 18. The steering device 10 has an inlet connection 20 which is connected to a first input 22 of the steering valve 12. The steering device 10 further has a return line connection 24 which is connected to an outlet 26 of the steering valve 12. Joined to the inlet connection 20 or respectively the return line connection 24 is a supply system which is designated in its entirety by 28. The supply system 28 comprises a supply pump 30 which is connected to the inlet connection 20 via a flow dividing valve 32. A tank 34 is further provided, which is connected to the return line connection 24. The flow dividing valve 32 forms a priority valve, by means of which a supply operation of the supply pump 30 between working hydraulics 36 and the steering device 10 can be controlled. When required by the hydraulic steering device 10, the flow dividing valve 32 receives a signal which assigns priority to the hydraulic steering device 10 before the working hydraulics 36, via a load connection 37 and a control line 38. The steering device 10 further has cylinder connections 40 and 42. The cylinder connection 40 is connected via a line 44, and the cylinder connection 42 is connected via a line 46, to the steering valve 12. Joined to the cylinder connections 40 and 42 is a steering cylinder 48 which is connected in a way which is not represented to steerable wheels of a vehicle. The connection 40 is connected to a chamber of the steering cylinder 48 responsible for the left steering direction, and the connection 42 is connected to a chamber of the steering cylinder 48 responsible for the right steering direction. Consequently, a main flow connection is configured from the supply pump 30 via the flow dividing valve 32 and the steering valve 12 to the steering cylinder 48 and from the steering cylinder 48 back via the steering valve 12 and the tank 34. The steering device 10 further comprises a flow control valve arrangement 50.

The flow control valve arrangement 50 has a first valve group 52 and a second valve group 54 as well as a common release shut-off valve 56. The valve group 52 comprises a valve 58 which is configured as an inlet valve and a valve 60 which is configured as a return line valve. The valve group 54 comprises a valve 62 which is configured as an inlet valve and a valve 64 which is configured as a return line valve. The valves 58, 60, 62 and 64 are, in each case, configured as proportional valves which are known to the person skilled in the art. In the case of such proportional valves, a control piston is held in an initial position by a compression spring and stops the volumetric flow, if the magnet is not operated. By exciting the magnet, the control piston is adjusted directly proportionally to the electrical input signal. The valves 58 and 60 are connected to the cylinder connection 40 and the valves 62 and 64 are connected to the cylinder connection 42. The valves 58 and 62 are connected or respectively can be connected via the release shut-off valve 56 to the inlet connection 20, and the valves 60 and 64 are connected or respectively can be connected via the release shut-off valve 56 to the return line connection 24. Consequently, an auxiliary flow connection is configured from the supply pump 30 via the flow control valve arrangement 50 to the steering cylinder 48 and from the steering cylinder 48 back via the flow control valve arrangement 50 and the tank 34. The steering cylinder 48 is therefore operatively connected hydraulically via the steering valve 12 to the supply system 28 via a main flow connection, and via the flow control valve arrangement 50 via an auxiliary flow connection which bypasses the main flow connection. For the purposes of actuation, the valves 58, 60, 62 and 64 which are designed as proportional valves are connected via control lines 66, 68, 70 or respectively 72 to a control unit 74.

If the release shut-off valve 56 is now connected from its represented shut-off position into the feed-through position via the control unit, that means the inlet connection 20 is connected to the valves 58 and 62 and the return line connection 24 is connected to the valves 60 and 64, the control unit 74 evaluates the signals supplied by the transducers 82 or respectively 80 and provides corresponding actuation signals via the control lines 66, 68, 70 or respectively 72 for the valves 58, 60, 62 or respectively 64. Herein the signals supplied by the transducers 88 and 90 comprise an actual position of the steering cylinder. Depending on whether a left-hand steering operation or a right-hand steering operation is effected via the steering valve 12, that is to say via the manual steering wheel 18, either the valve 58 and the valve 64 for left-hand steering or the valve 60 and the valve 62 for right-hand steering are actuated via the control unit 74. As a result, a defined opening cross-section is adjusted, which supplies an auxiliary oil flow proportional to the main oil flow. The volumetric flow of the auxiliary oil flow is dependent on the pressure difference which prevails at the respective valve 58, 60, 62, 64.

FIG. 2 shows a representation in principle of a hydraulic steering device according to the invention in a preferred embodiment. If reference numerals which are identical to those of FIG. 1 are used, then these describe identical features. What is described in FIG. 1 applies at least in addition to FIG. 2. The fundamental construction of the steering device 100 according to the invention represented in FIG. 2 is similar to the prior art shown in FIG. 1, such that simply those features which demarcate the present invention from the prior art in FIG. 1 are dealt with in the present embodiment example. It is clear from FIG. 2 that the steering device 100 according to the invention does not have the valves 58, 60, 62, 64 which are configured as proportional valves and which are shown in FIG. 1. Instead, the embodiment example of the present invention shown in FIG. 2 has valves 102, 104, 106, 108 which are configured as two-way flow control valves. These are configured to produce a definable volumetric flow independently of a pressure difference which prevails at the respective valve 102, 104, 106, 108. Likewise, the valves 102, 104, 106, 108 are configured to produce a definable volumetric flow independently of a temperature of the respective valve 102, 104, 106, 108 and independently of a temperature of a fluid flowing through the respective valve 102, 104, 106, 108. In particular, failures can be compensated for with the steering device 100, in the event that one of the valves 102, 104, 106, 108 does not function as envisaged.

This is illustrated, by way of example, in the following scenario. For a right-hand steering of the steering cylinder 48 (movement of the steering cylinder 48 from right to left) it is necessary for the valve 104 which is configured as a return line valve 104 to be open, such that an oil flow can flow out of the steering cylinder 48 via the cylinder connection 40. The valve 102 is configured as an inlet valve and is closed in this case. Similarly, in the case of a left-hand steering of the steering cylinder 48 (movement of the steering cylinder 48 from left to right), the valve 104 must be closed such that a corresponding pressure can build up in the steering cylinder 48 via the cylinder connection 40, if the oil flow flows through the valve 102 in the direction of the steering cylinder 48.

Notionally taking this scenario as a basis for the invention, the vehicle has a conventional hydraulic steering device with proportional valves. If left-hand steering were intended here and the valve 104 were still open due to a failure, a driver of the vehicle would not be able to steer to the left. In the case of a conventional proportional valve, the entire oil flow would then flow via the valve 104 which is open due to the failure in the direction of the tank 36.

This can be prevented with the present invention since the valves 102, 104 are configured as two-way flow control valves in accordance with the invention. Here, by way of a suitable valve control with an appropriate control algorithm which the competent person skilled in the art automatically implements, the valve 102 (inlet valve) can be adjusted to a volumetric flow nominal value which is above the volumetric flow which is flowing through the valve 104 as a consequence of the existing degree of opening of the valve 104 (return line valve) due to the failure. Consequently, a saturation of the volumetric flow can be produced at the valve 104. A residual volumetric flow which is then still available via the valve 102 continues to be available to the steering function. If an additional quantity of oil is then made available to the supply pump 30, evidence can be provided that a steering behaviour corresponding to the requirements of the prevailing standards and guidelines is guaranteed in the vehicle. In the event of a possible valve failure, the system recognises this failure and compensates for it accordingly. The steering capability of the steering device is retained.

By using 2-way flow control valves, it is further possible to support a force acting on the steering cylinder 48 in a defined way since the volumetric flow characteristic of the 2-way flow control valves is independent of the pressure.

REFERENCE NUMERALS

10 Steering device
12 Steering valve
14 Metering pump
16 Steering linkage
18 Manual steering wheel
20 Inlet connection
22 Input
24 Return line connection
26 Outlet
28 Supply system
30 Supply pump
32 Flow dividing valve
34 Tank
36 Working hydraulics
37 Load connection
38 Control line
40 Cylinder connection
42 Cylinder connection
44 Line
46 Line
48 Steering cylinder
50 Flow control valve arrangement
52 Valve group
54 Valve group
56 Release shut-off valve
58 Valve
60 Valve
62 Valve
64 Valve
66 Control line
68 Control line
70 Control line
72 Control line
74 Control unit
76 Control line
78 Control line
80 Transducer
82 Transducer
100 Steering device
102 Valve
104 Valve
106 Valve
108 Valve

The invention claimed is:

1. A hydraulic steering device which hydraulically connects a steering cylinder to a supply system, wherein the supply system can be operatively connected hydraulically to the steering cylinder via a steering valve in order to configure a main flow connection, and the supply system can be operatively connected hydraulically to the steering cylinder via a flow control valve arrangement in order to configure an auxiliary flow connection which bypasses the main flow connection, wherein the flow control valve arrangement can be actuated by way of an electrical control unit, and the flow control valve arrangement comprises individually actuable valve groups which are connected in each case into a feed line and a return line of the auxiliary flow connection, wherein
 each of the individually actuable valve groups comprises at least one valve configured to produce a constant definable volumetric flow independently of a pressure difference which prevails at the valve,
 a first valve group of the individually actuable valve groups comprises an inlet valve and a return line valve,
 the inlet and return line valves are two-way flow control valves, and
 the inlet valve is adjustable via a valve control such that the inlet valve is adjusted to provide a volumetric flow nominal value that is above a volumetric flow flowing through the return line valve as a consequence of an existing degree of opening of the return line valve due to a valve failure.

2. The hydraulic steering device according to claim 1, wherein the at least one valve is furthermore configured to produce a defined or definable volumetric flow independently of a temperature of the valve and/or a temperature of a fluid flowing through the valve.

3. The hydraulic steering device according to claim 1, wherein the flow control valve arrangement comprises:
 the first valve group having the inlet valve connected into a feed line of right-hand steering and the return line valve connected into a return line of right-hand steering; and
 a second valve group comprising a first valve connected into a feed line of left-hand steering and a second valve connected into a return line of left-hand steering.

4. The hydraulic steering device according to claim 1, wherein a common release shut-off valve is arranged upstream of the flow control valve arrangement.

5. The hydraulic steering device according to claim 4, wherein the common release shut-off valve is configured to shut the flow control valve arrangement off in the event of the valve failure.

6. The hydraulic steering device according to claim 1, wherein the flow control valve arrangement is operatable as a solo device, as a pure "steer-by-wire" system.

7. The hydraulic steering device according to claim 1, wherein, to check the plausibility of valve actuation signals, the control unit is connected to transducers configured to detect an actual position of the steering cylinder.

8. A hydraulic steering device which hydraulically connects a steering cylinder to a supply system, wherein the supply system can be operatively connected hydraulically to the steering cylinder via a steering valve in order to configure a main flow connection, and the supply system can be operatively connected hydraulically to the steering cylinder via a flow control valve arrangement in order to configure an auxiliary flow connection which bypasses the main flow connection, wherein the flow control valve arrangement can be actuated by way of an electrical control unit, and the flow control valve arrangement comprises individually actuable valve groups which are connected in each case into a feed line and a return line of the auxiliary flow connection,
wherein
at least one valve group of the individually actuable valve groups comprises at least one valve that is a two-way flow control valve configured to produce a volumetric flow,
the volumetric flow is a constant definable volumetric flow independent of a pressure difference which prevails at the at least one valve, and
a movement speed is impressable on the steering cylinder, independently of steering forces occurring or independently of a pressure difference prevailing at valves of the individually actuable valve groups as a consequence of the automatic control of the volumetric flow via the at least one valve of the individually actuable valve groups.

9. A hydraulic steering device which hydraulically connects a steering cylinder to a supply system, wherein the supply system can be operatively connected hydraulically to the steering cylinder via a steering valve in order to configure a main flow connection, and the supply system can be operatively connected hydraulically to the steering cylinder via a flow control valve arrangement in order to configure an auxiliary flow connection which bypasses the main flow connection, wherein the flow control valve arrangement can be actuated by way of an electrical control unit, and the flow control valve arrangement comprises a first valve group comprising first valves and a second valve group comprising second valves,
wherein
at least one valve of the first valves and the second valves is a two-way flow control valve configured to produce a constant definable volumetric flow independently of a pressure difference which prevails at the at least one valve,
the first valve group comprises a first inlet valve connected into a first feed line of right-hand steering and a first return line valve connected into a first return line of right-hand steering,
the second valve group comprises a second inlet valve connected into a second feed line of left-hand steering and a second return line valve connected into a second return line of left-hand steering, and
the first and second inlet valves in the respective first and second feed lines are two-way flow control valves configured to provide a volumetric flow with definable, constant, and/or nominal value above a volumetric flow flowing through the first and second return line valves in the respective first and second return line as a consequence of an existing degree of opening of at least one of the first return line valve and the second return line valve and the pressure prevailing at the first valve group and/or the second valve group.

* * * * *